(12) United States Patent
Cheng

(10) Patent No.: US 6,578,411 B2
(45) Date of Patent: Jun. 17, 2003

(54) METHOD AND APPARATUS FOR ANALYZING A DRIVETRAIN ASSEMBLY

(75) Inventor: Ming-Te Cheng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,973

(22) Filed: Nov. 5, 2001

(65) Prior Publication Data

US 2003/0084709 A1 May 8, 2003

(51) Int. Cl.[7] .............................................. G01M 15/00
(52) U.S. Cl. ........................................ 73/118.1; 701/29
(58) Field of Search ................................ 73/116, 117.2, 73/117.3, 118.1; 701/29

(56) References Cited

U.S. PATENT DOCUMENTS

| | | | | |
|---|---|---|---|---|
| 4,283,957 A | * | 8/1981 | Zobrist et al. | 73/814 |
| 5,771,482 A | * | 6/1998 | Rizzoni | 123/406.23 |
| 5,955,674 A | * | 9/1999 | McGovern et al. | 701/111 |
| 6,128,959 A | * | 10/2000 | McGovern et al. | 73/460 |
| 6,299,540 B1 | * | 10/2001 | Ament | 192/213.12 |
| 6,314,342 B1 | * | 11/2001 | Kramer et al. | 180/197 |

OTHER PUBLICATIONS

"Modal Testing: Theory and Practice" (book); Author: D.J. Ewans; ISBN 0 86380 017 3 (Wiley Inc. 0 471 90472 4); Research Studies Press Ltd., Taunton, Somerset, England 1984.

"The Natural Excitation Technique (NeXT) for Modal Parameter Extraction From Operating Wind Turbines" (Sandia Report); Authors: George H. James III, Thomas G. Carne, James P. Lauffer; SAND92–1666, UC–261; Sandia National Laboratories, Albuquerque, New Mexico, USA. (No date).

"Source Analysis, A Technique for Multiple Input System Identification with Application to Combustion Energy Separation in Piston Engines" (paper); Author: Michael F. Albright; Society of Automotive Engineers, reference No. 951376. (No date).

* cited by examiner

Primary Examiner—Eric S. McCall
(74) Attorney, Agent, or Firm—Frank G. McKenzie

(57) ABSTRACT

A method and an apparatus 10 for determining or identifying the torsional modes of a portion of a vehicle 12, such as a drivetrain assembly including a crankshaft 14, a driveshaft 16, a transmission assembly 18, and axles 24, 26. The torsional modes are discerned by use of the torque generator 14 such as an internal combustion engine, which is normally and operatively disposed within the vehicle 12, thereby obviating the need to replace the internal combustion engine 14 with a dynamometer and/or other type of signal generator assembly.

6 Claims, 2 Drawing Sheets

METHOD AND APPARATUS FOR ANALYZING A DRIVETRAIN ASSEMBLY

BACKGROUND OF THE INVENTION

1. Field of the Invention.

The presFIG. 2 is a flowchart illustrating the sequence of steps which cooperatively comprise the methodology of the preferred embodiment of the invention.ent invention generally relates to a metIt is a second non-limiting advantage of the present invention to provide a method and an apparatus for determining a torsional modal response of a portion of a vehicle in a manner which overcomes some or all of the previously delineated disadvantages of prior strategies. It is a third non-limiting advantage of the present invention to provide a method and an apparatus for conducting a torsional modal analysis upon a vehicle by use of the existing torque generator which is normally or conventionally disposed within the vehicle. According to a first non-limiting aspect of the present invention, an assembly for use in combination with a vehicle of the type having a selectively activatable torque generator is provided. Particularly, the assembly is adapted to identify a torsional mode of a portion of the vehicle by use of the torque generator. According to a second non-limiting aspect of the present invention, an assembly is provided. Particularly, the assembly comprises at least one sensor which is deployed upon a portion of a vehicle and which provides a certain signal having a first portion and a random portion; and a controller which is coupled to the at least one sensor, which receives the signal, which removes the first portion, and which utilizes the random portion to determine the existence of a torsional mode of the portion of the vehicle. According to a third non-limiting aspect of the invention, a method is provided for identifying a torsional mode of a vehicle of the type having a torque generator. Particularly, the method comprises the steps of activating the torque generator, effective to cause a portion of the vehicle to vibrate; measuring the vibration of the portion of the vehicle; and using the measurement to determine the torsional mode. These and other features, aspects, and advantages of the present invention will become apparent from a reading of the following detailed description of the preferred embodiment of the invention and by reference to the following drawings.hod and an apparatus for analyzing a drivetrain assembly and more particularly, to a method and an apparatus for determining the existence of a torsional mode of a drivetrain assembly, or other portion of a vehicle, by the use of the torque generator which is normally deployed within the vehicle.

2. Background of the Invention

It is desirable to determine the torsional modal response of a drivetrain assembly or other portion of a vehicle in order to discern the torsional modes of the tested portion of the vehicle. Such torsional modes are used to ascertain the behavior of the tested portion of the vehicle in actual vehicular operation.

Conventionally, a dynamometer and a pseudo-randomly varying signal source are employed to excite the portion of the vehicle which is to be tested. While this strategy does allow the torsional modal response of the tested portion to be ascertained, it suffers from some drawbacks. That is, in order to conduct such an analysis, the torque generator (e.g., the internal combustion engine) which is normally or typically present within the vehicle is removed and replaced with the dynamometer and the signal source (e.g., a pseudorandom type exciter assembly). For example, these signal sources are typically and directly coupled to the vehicle's transmission assembly and cooperatively simulate the removed torque generator. The resulting vibration of the tested portion is then captured and analyzed to determine the existence of torsional modes. The removal of the torque generator (the engine) and the replacement of the removed torque generator with the foregoing assemblies is time consuming, costly, increases the likelihood of damage to the torque generator and to the signal assemblies, and does not exactly simulate the operation of the removed torque generator, thereby potentially causing an errant analysis to be conducted. The present invention overcomes these drawbacks in a new and novel manner.

SUMMARY OF INVENTION

It is a first non-limiting advantage of the present invention to provide a method and an apparatus for analyzing a drivetrain assembly which overcomes some or all of the previously delineated disadvantages of prior strategies.

It is a second non-limiting advantage of the present invention to provide a method and an apparatus for determining a torsional modal response of a portion of a vehicle in a manner which overcomes some or all of the previously delineated disadvantages of prior strategies.

It is a third non-limiting advantage of the present invention to provide a method and an apparatus for conducting a torsional modal analysis upon a vehicle by use of the existing torque generator which is normally or conventionally disposed within the vehicle.

According to a first non-limiting aspect of the present invention, an assembly for use in combination with a vehicle of the type having a selectively activatable torque generator is provided. Particularly, the assembly is adapted to identify a torsional mode of a portion of the vehicle by use of the torque generator.

According to a second non-limiting aspect of the present invention, an assembly is provided. Particularly, the assembly comprises at least one sensor which is deployed upon a portion of a vehicle and which provides a certain signal having a first portion and a random portion; and a controller which is coupled to the at least one sensor, which receives the signal, which removes the first portion, and which utilizes the random portion to determine the existence of a torsional mode of the portion of the vehicle.

According to a third non-limiting aspect of the invention, a method is provided for identifying a torsional mode of a vehicle of the type having a torque generator. Particularly, the method comprises the steps of activating the torque generator, effective to cause a portion of the vehicle to vibrate; measuring the vibration of the portion of the vehicle; and using the measurement to determine the torsional mode.

These and other features, aspects, and advantages of the present invention will become apparent from a reading of the following detailed description of the preferred embodiment of the invention and by reference to the following drawings.

DETAILED DESCRIPTION

Figure 1:
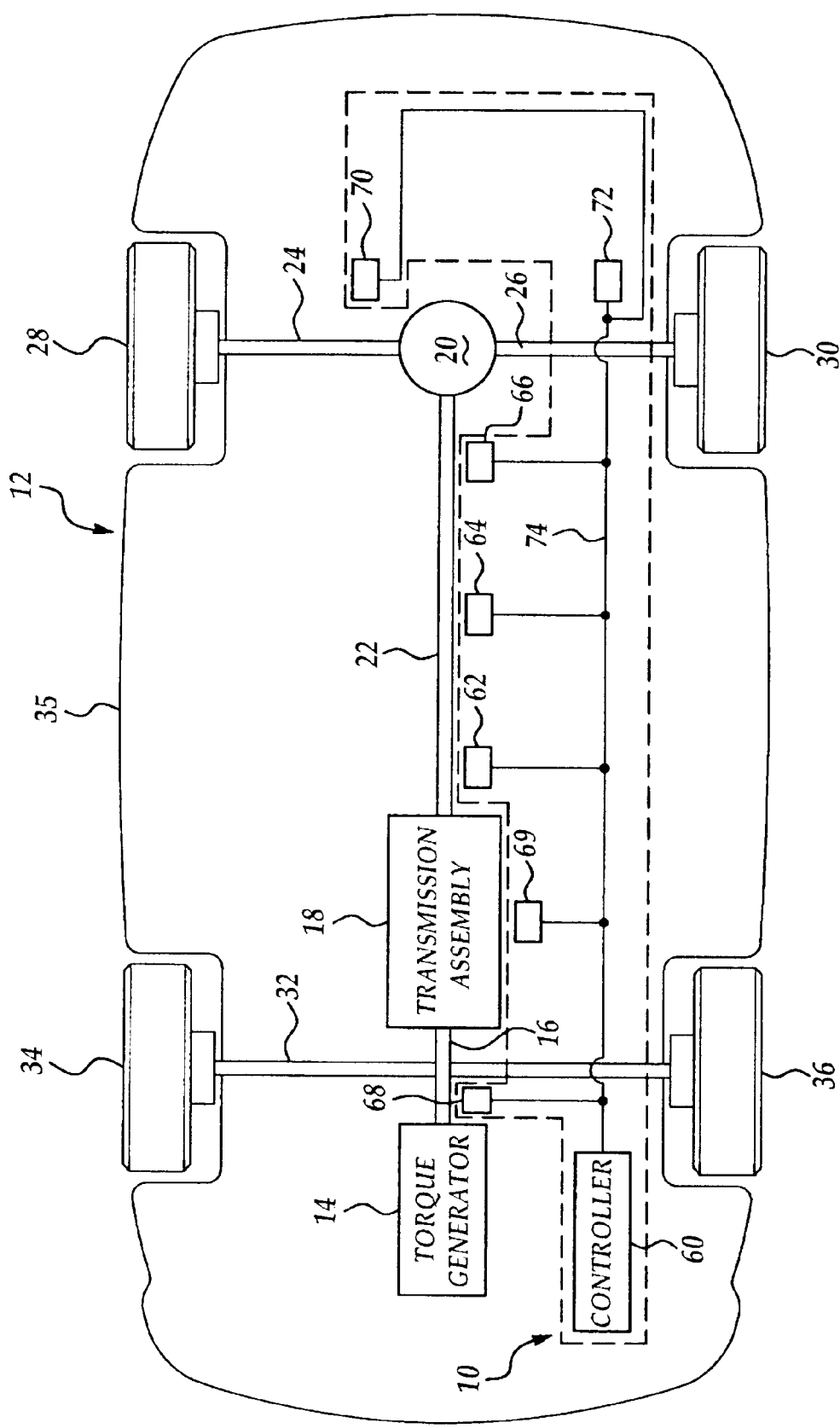
FIG. 1 is a block diagram of a testing assembly which is made in accordance with the teachings of the preferred embodiment of the invention being operatively disposed within a vehicle.

Referring now to FIG. 1, there is shown a testing assembly 10 which is made in accordance with the teachings of the preferred embodiment of the invention and which is disposed within a vehicle 12.

As shown, vehicle 12 includes a torque generator 14, such as but not limited to an internal combustion engine, a crankshaft 16 which is coupled to the torque generator 14, a transmission assembly 18 which is coupled to the crankshaft 16, a differential assembly 20 which is coupled to the transmission assembly 18 by an output or driveshaft 22, and a pair of half-shafts or axles 24, 26 which are coupled to the differential assembly 20. Vehicle 12 further includes wheels 28, 30 which respectively receive axles or half-shafts 24, 26, a front axle 32 which receives wheels 34, 36, and a support member 35 which receives axles 24, 26, and 32.

In normal operation, torque which is generated from the generator 14 is communicated to the transmission assembly 18 by the crankshaft 16. The transmission assembly 18 communicates this received torque to the differential assembly 20 by the output or driveshaft 22 and the differential assembly 20 communicates the received torque to the half-shafts or axles 24, 26, effective to allow the wheels 28, 30 to rotate and to selectively propel the vehicle 12. It should be appreciated that vehicle 12 may comprise any of a variety of configurations and that nothing in this description is meant to limit the applicability of the present invention to a particular vehicular type or configuration. Moreover, it should be appreciated that only the relevant portions of the vehicle 12 are shown within FIG. 1.

As further shown in FIG. 1, assembly 10 includes a controller 60 which is operable under stored program control and several vibration sensors 62, 64, 66, 68, 69, 70, and 72 which are coupled to the controller 60 by the use of bus 74. Particularly, each of the sensors 62–72, in the preferred embodiment of the invention, are substantially identical and are adapted to detect vibrations which occur upon and /or which emanate from the portion of the vehicle 12 that they are respectively attached to or reside in close proximity to. For example, each of the sensors 62–66 detect vibrations emanating from and/or which are produced by certain respective and unique portions of driveshaft 22, sensor 68 detects vibrations which emanate from and/or are produced by the crankshaft 16, sensor 69 detects vibrations which emanate from or are produced by the transmission assembly 18, and the sensors 70, 72 detect vibrations which emanate from or are produced by the half-shafts 24,26. The detected or captured vibratory information is then communicated to the controller 60 by the bus 74. It should be appreciated that different amounts of such sensors 62–72 may be used in other non-limiting embodiments of the invention and that these sensors 62–72 may detect vibrations emanating from or produced by any desired portion of the vehicle 12. In the most preferred embodiment of the invention, as shown in FIG. 1, the sensors 62–74 cooperatively detect vibration of the drivetrain assembly of the vehicle 12 (the term drivetrain assembly means the combination of the crankshaft 16, the driveshaft 22, the transmission assembly 18, and the axles or half-shafts 24, 26). However, as earlier delineated, other portions of the vehicle 12 maybe analyzed. The operation of the assembly 10 is more fully described below.

Figure 2:
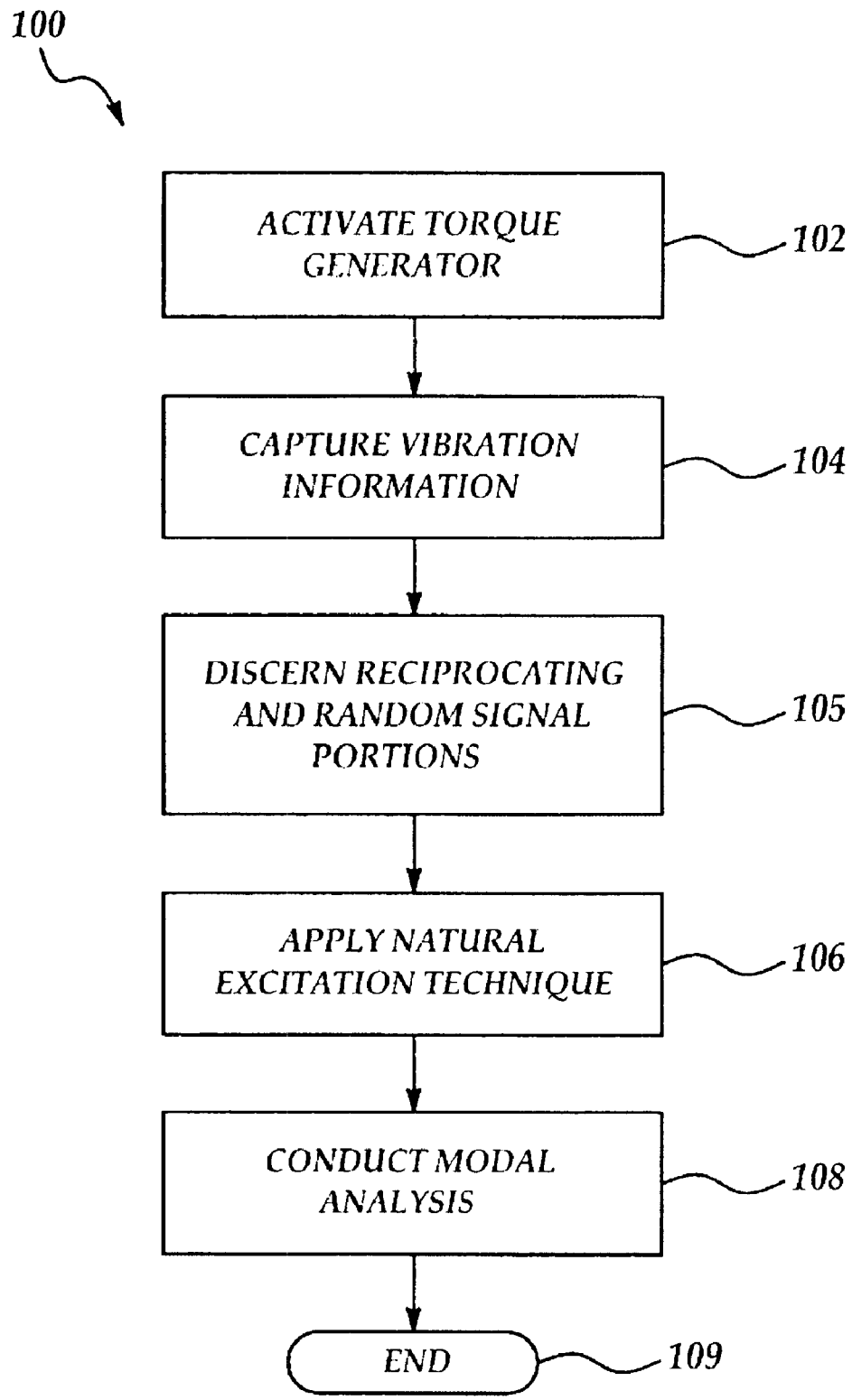
FIG. 2 is a flowchart illustrating the sequence of steps which cooperatively comprise the methodology of the preferred embodiment of the invention.

Referring now to FIG. 2, there is shown a flowchart 100 which illustrates and/or which includes the various operational steps which comprise the methodology of the preferred embodiment of the invention. Particularly, methodology or flowchart 100 begins with step 102 in which the torque generator 14 is activated. Step 104 follows step 102 and, in this step 104, the sensors 62–72 detect the amount and frequency of the vibration of the portion of the vehicle 12 to which the sensors 62–72 are respectively attached or placed in close proximity to. Particularly, each of the signal outputs from each sensor 62–72 includes a reciprocating portion and a random portion and are communicated to the controller 60. Step 105 follows step 104 and, in this step 105, the reciprocating portion and the random portions are discerned by the controller 60 by the use of the technique of Conditional Source Analysis which is discussed within the paper entitled Conditional Source Analysis, a Technique for Multiple Input System Identification with Application to Combustion Energy Separation in Piston Engines, which is authored by Michael F. Albright which is published by the Society of Automotive Engineers (reference number 951376), and which is fully and completely incorporated herein by reference, word for word and paragraph for paragraph. The respective reciprocating portion of each signal produced by the sensors 62–72 is discarded. Step 106 follows step 105 and, in this step 106, each remaining random signal is then subjected, by the controller 60, to the Natural Excitation Technique described within the publication entitled The Natural Excitation Technique (NEXT) for Modal Parameter Extraction from Operating Wind Turbines, which is authored by George H. James III, Thomas G. Carne, and James P. Lauffer, and which is published by the Sandia National Laboratories (Sandia Report Number SAND92-1666- UC261) and which is fully and completely incorporated herein by reference, word for word and paragraph for paragraph. This technique is effective to produce modal parameters for each respective signal produced by a sensor 62–72. Step 108 follows step 106 and, in this step, a conventional modal analysis is accomplished, by the controller 60, upon the provided parameters. Such an analysis is described within the text entitled Modal Testing: Theory and Practice, which is authored by D J. Ewins, which is published by the Research Studies Press (ISBN 0 86380 017 3) and which is fully and completely incorporated herein by reference, word for word and paragraph for paragraph. Here, it should be appreciated that the foregoing torsional modal analysis may be conducted by use of the torque generator 14 what is normally or conventionally deployed within the vehicle 12, such as an internal combustion engine, thereby obviating the need for a dynamometer and other type of signaling assembly and obviating the need for removing the torque generator 14 (e.g., an internal combustion engine) from the vehicle 12. Step 109 follows step 108 and, in step 109, controller 60 concludes the methodology 100 of the preferred embodiment of the invention.

It is to be understood that the invention is not limited to the exact construction and method which has been delineated above, but that various changes and modifications may be made without departing from the spirit and the scope of the inventions as are more fully delineated in the following claims. Particularly, it should be appreciated that the combination of the Conditional Source Analysis technique with the Natural Excitation technique allows the internal combustion engine 14 to operatively remain within the vehicle 12 during the methodology 100 and to be used to conduct the foregoing modal analysis. These combined techniques cooperatively eliminate the reciprocating portion of the vibration signals caused by the engine 14 and allows modal parameters to be produced for each such vibratory signal.

What is claimed is:

1. A method for identifying a torsional mode of a vehicle having a torque generator, said method comprising the steps of:

activating said torque generator, thereby causing a portion of said vehicle to vibrate;

providing a controller;

measuring said vibration of said portion of said vehicle; generating a signal having a reciprocating and a random portion in response to said measured vibration;

causing said controller to discern and remove said reciprocating causing said controller to produce at least one modal parameter by providing a natural excitation technique and applying said natural excitation technique to said random portion; and causing said controller to identify said torsional mode by analyzing said at least one modal parameter.

2. The method of claim 1 wherein said portion of said vehicle comprises a crankshaft.

3. The method of claim 1 wherein said portion of said vehicle comprises a driveshaft.

4. The method of claim 1 wherein said portion of said vehicle comprises an axle.

5. The method of claim 1 wherein said step of using said random portion to identify said torsional mode comprises the step of conducting a modal analysis upon said random portion.

6. The method of claim 1, wherein said step of causing said controller to discern and remove said reciprocating portion further comprises the steps of:

providing a conditional source analysis technique; and applying said conditional source analysis technique to said signal.

* * * * *